(12) United States Patent
Gao et al.

(10) Patent No.: US 10,559,904 B1
(45) Date of Patent: Feb. 11, 2020

(54) LINK MODULE FOR A SCALABLE MULTIPROCESSOR SYSTEM

(71) Applicant: Cisco Technology, Inc., San Jose, CA (US)

(72) Inventors: Le Gao, Shanghai (CN); Yang Sun, Hangzhou (CN); Yepeng Chen, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/357,976

(22) Filed: Mar. 19, 2019

(51) Int. Cl.
    *H01R 9/26* (2006.01)
    *H01R 12/77* (2011.01)
    *H01R 12/70* (2011.01)

(52) U.S. Cl.
    CPC ....... *H01R 12/777* (2013.01); *H01R 12/7082* (2013.01)

(58) Field of Classification Search
    CPC ...... H01R 9/26; H01R 9/2675; H01R 9/2408; H01R 27/00; H01R 103/00
    USPC .......................... 439/716, 218, 715, 717, 222
    See application file for complete search history.

(56) References Cited

U.S. PATENT DOCUMENTS

| | | | | |
|---|---|---|---|---|
| 6,418,027 B1* | 7/2002 | Suzuki | ................ | G06F 1/183 361/679.02 |
| 7,480,147 B2* | 1/2009 | Hoss | ................ | G06F 1/20 361/715 |
| 8,986,033 B2* | 3/2015 | Berger | ................ | H05K 7/1468 439/341 |
| 9,943,004 B2* | 4/2018 | Canfield | ................ | H05K 7/1417 |
| 9,949,399 B2* | 4/2018 | Canfield | ................ | H05K 7/1417 |
| 9,966,714 B1* | 5/2018 | Sreedharan | ................ | H01R 9/2675 |
| 9,996,070 B2* | 6/2018 | Shimizu | ................ | G05B 19/05 |
| 10,028,404 B2* | 7/2018 | Wehrle | ................ | H05K 7/1468 |

(Continued)

FOREIGN PATENT DOCUMENTS

| CN | 104199521 A | 12/2014 |
|---|---|---|
| CN | 107436860 A | 12/2017 |

OTHER PUBLICATIONS

Fujitsu Limited, "Data Sheet Fujitsu Server Primergy CX2560 M4 Multi-node Server", All-round server node for Primergy CX400 M4, http://www.fujitsu.com/fts/products/computing/servers/primergy/scale-out/cx2560m4/, Oct. 17, 2018, 11 pages.

(Continued)

*Primary Examiner* — Phuong Chi Thi Nguyen
(74) *Attorney, Agent, or Firm* — Edell, Shapiro & Finnan, LLC

(57) ABSTRACT

A scalable multiprocessor computing system includes first and second computing devices and a link module connecting the computing devices. The link module includes a guide connector that aligns and couples the first computing device with the second computing device in an orientation in which a printed circuit board assembly (PCBA) support housing wall of the first computing device faces a PCBA support housing wall of the second computing device, a bracket member that is connected along corresponding lengthwise sides of the first and second computing devices, and a cable connector that provides a signal connection between the processor of the first computing device and the processor of the second computing device. The guide connector is connected to the bracket member.

20 Claims, 12 Drawing Sheets

(56) References Cited

U.S. PATENT DOCUMENTS 10,411,372 B2 * 9/2019 Kang .................. H01R 9/2608

OTHER PUBLICATIONS

Huawei Technologies Co., Ltd., "Huawei FusionServer E9000 Converged Architecture Blade Server", https://e.huawei.com/en/material/onLineView?materialid=8d00ee21c8ab4dda93368b4f0e60e814, downloaded Mar. 19, 2019, 20 pages.
Cisco, "Cisco UCS B460 M4 Blade Server", https://www.cisco.com/c/en/us/products/servers-unified-computing/ucs-b460-m4-blade-server/index.html, downloaded Mar. 13, 2019, 2 pages.
David Watts et al., "IBM BladeCenter HX5 (7873)", https://lenovopress.com/tips0824. Jun. 25, 2014, 31 pages.
Nanjing ZTE software Co. Ltd., "ZXCLOUD E9000", https://sdnfv.zte.com.cn/en/products/ICT-hardware/server/E9000, downloaded Mar. 19, 2019, 4 pages.

* cited by examiner

LINK MODULE FOR A SCALABLE MULTIPROCESSOR SYSTEM

TECHNICAL FIELD

The present disclosure relates to providing a secure linking module to connect processors of two or more computing systems (e.g., two or more servers) to provide a multiprocessor system.

BACKGROUND

The computing or CPU performance of servers is becoming increasingly important for a number of industries, which is leading to ever increasing sizes or combinations of two or more servers to achieve faster processing performance for a greater number of processing operations. Ultra Path Interconnect (UPI) is a new interconnect technology for providing a scalable multiprocessor system (e.g., by linking the processors of two or more servers together). However, a number of issues are presented when trying to provide a UPI linking connection between the processors of two or more servers.

DESCRIPTION OF EXAMPLE EMBODIMENTS

Overview

Figure 1:
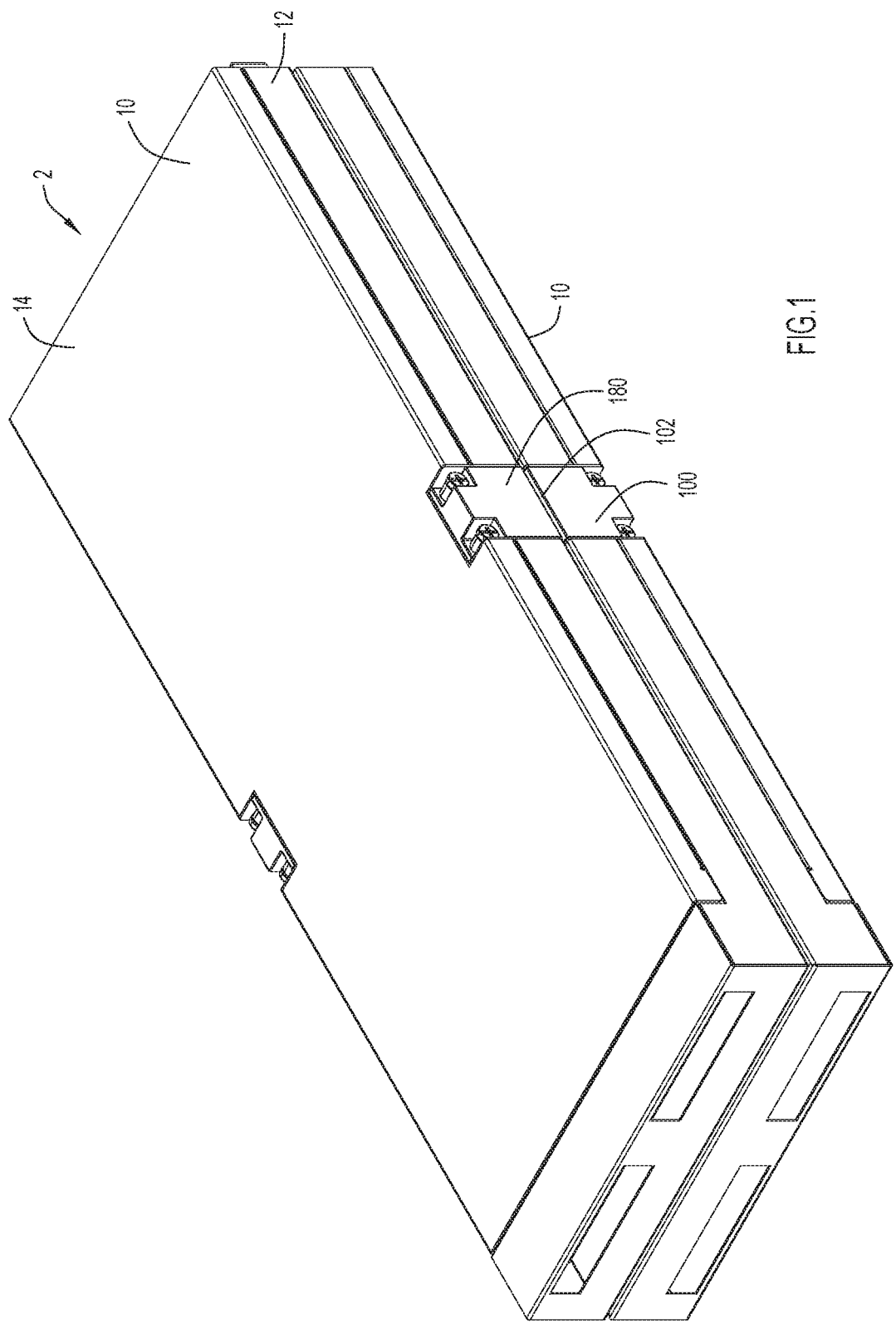
FIG. 1 depicts a view in perspective of a scalable multiprocessor system including a pair of half width blade servers connected via link modules in a "bell-to-belly" configuration.

In example embodiments, a scalable multiprocessor computing system comprises a first computing device including a housing, a printed circuit board assembly (PCBA) secured within the housing, and a processor and memory integrated with the PCBA, a second computing device including a housing, a printed circuit board assembly (PCBA) secured within the housing, and a processor and memory integrated with the PCBA, and a link module connecting the first computing device with the second computing device. The link module comprises a guide connector that aligns and couples the first computing device with the second computing device in an orientation in which a PCBA support housing wall of the first computing device faces a PCBA support housing wall of the second computing device, a bracket member that is connected along corresponding lengthwise sides of the first and second computing devices, and a cable connector that provides a signal connection between the processor of the first computing device and the processor of the second computing device. The guide connector is connected to the bracket member.

In other example embodiments, a link module is provided for connecting a first computing device with a second computing device to form a scalable multiprocessor system, each of the computing devices including a housing and a printed circuit board assembly (PCBA) secured within the housing and including a processor. The link module comprises a guide connector that aligns the first computing device with the second computing device in a configuration in which a PCBA support housing wall of the first computing device faces a PCBA support housing wall of the second computing device, a bracket member that is connectable along corresponding lengthwise sides of the first and second computing devices, and a cable connector that provides a signal connection between the processor of the first computing device and the processor of the second computing device. The guide connector connects with the bracket member.

In further example embodiments, a method of forming a scalable multiprocessor computing system is provided. The method comprises providing a first computing device including a housing, a printed circuit board assembly (PCBA) secured within the housing, and a processor and memory integrated with the PCBA, providing a second computing device including a housing, a printed circuit board assembly (PCBA) secured within the housing, and a processor and memory integrated with the PCBA, orienting the first computing device with the second computing device in a belly-to-belly configuration such that a PCBA support housing wall of the first computing device faces a PCBA support housing wall of the second computing device, and providing a link module that connects along corresponding lengthwise sides of the first and second computing devices by: connecting a bracket member along the corresponding lengthwise sides of the first and second computing devices, coupling a guide connector to the first computing device and the second computing device oriented in the belly-to-belly configuration, and connecting a cable connector with signal path connectors disposed on the PCBAs of the first and second computing devices to provide signal connections between the processors of the first and second computing devices.

Example Embodiments

To enhance CPU performance, computer systems are being designed including multiprocessors that are linked to facilitate the exchange of data signals between each other for achieving multiple concurrent and/or sharing of processing operations (e.g., parallel processing operations by two or more processors) in the overall computing system at any given time. An example scenario is in server operations, where two or more servers are coupled so as to link their processors together for performing simultaneous and concurrent processing operations. For example, Ultra Path Interconnect (UPI) is a new interconnect technology developed by Intel Corporation for use in scalable multiprocessor systems. However, for certain types of servers, such as half width blade servers, the configuration of the CPU layout on the printed circuit board assembly (PCBA) can present a challenge to achieving a desirable UPI trace length for each processor as well as ensuring the UPI connection is maintained during system operations. As used herein, the term "blade server" refers to a server computing device that is stripped down or has a reduction in certain components that are in other types of servers (e.g., rack mount servers), where the blade server has a modular design that minimizes physical space of the server to allow multiple blade servers to be easily housed within an enclosure or chassis (where the chassis can provide certain components or features for the blade servers, including power, cooling, networking, etc.). However, blade servers typically include components such as one or more processors and one or more memory modules. Blade servers can be full width or half width blade servers that have well known form factors. A half width blade server differs from a full width blade server in that the half width blade server is sized to fit within a half slot of a blade server chassis (whereas the full width blade server fits within a full slot of the blade server chassis).

In a an example scenario of combining two half width blade servers to provide four interconnect processors for a server system, a number of challenges exist (whether using a back plane printed circuit board connection or front cables for the UPI connection), such as: ensuring that the UPI trace length (i.e., length of the UPI signal transmission line connection) is the same or substantially similar for each processor and is further within acceptable limits according to UPI specifications; concern with utilizing an interposer card to make a connection between the two servers can lead to damage to the UPI connectors of the card (e.g., due to increased insertion/removal operations of the card, the weight of a server bearing on the card depending on its location, etc.); and providing a UPI connection architecture that will facilitate easy installation and/or replacement of components within each server (e.g., heat sinks, DIMMs or other forms of memory modules, etc.) during periods of long term use of the server system.

The embodiments described herein provide a link module that connects two or more computing devices (e.g., servers) together and further provides signal connections between processors of the devices to facilitate multiprocessor operations and increasing computing performance by the combined devices. The link module further has a simple design that easily connects the computing devices together, can shorten signal path lengths between processors of the devices, and also facilitates easy installation or replacement of other components (e.g., memory modules) within each computing device.

An example embodiment of a link module that connects two computing devices together to provide a scalable multiprocessor system is now described with reference to FIGS. 1-10.

Referring to FIGS. 1-4, a scalable multiprocessor server system 2 includes a pair of blade servers 10 secured or connected together utilizing one or more link modules 100 as described herein. A non-limiting example embodiment of a suitable blade server that can be combined with a link module as described herein comprises any Unified Computing System (UCS) blade server commercially available from Cisco Technology Inc. In the example embodiments, each server 10 is a half width blade server including notched or cut-out sections along its sides to accommodate link module components as described herein.

Each half width blade server 10 comprises a dual processor server including a generally rectangular housing 12 including a top cover 14 (removed in FIG. 2 to reveal components within the blade server 10), where a printed circuit board assembly (PCBA) 16 is secured within the housing 12. Two processor modules are integrated with the PCBA 16 within the blade server 10, each processor module including a processor 20, a plurality of memory modules 30 (e.g., DIMMs) and any other suitable components that facilitate operation of the processor modules. The blade servers 10 connect with each other in a "belly-to-belly" configuration (i.e., with the bottom or PCBA supporting housing wall of each blade server facing the other blade server). A signal pathway between processors for each server 10 is provided along and/or within the PCBA 16 to facilitate communication of signals between the processors. In addition, and as described further herein, signal pathways are also provided between processors 20 of the two connected servers 10 via the link modules 100 that connect the servers together. The servers can utilize any suitable signal path interconnect configuration, such as an Ultra Path Interconnect (UPI) configuration as developed by Intel Corporation.

In the embodiments shown in the figures, two link modules 100 are connected to the pair of servers 10 at locations along the lengthwise housing sides of the servers (where the link modules connect on opposing lengthwise sides of the servers). The housing 12 and PCBA 16 include generally U-shaped and inwardly extending notches or cut-out sections disposed along their sides to facilitate connection of the link modules 100 with the servers 10 in the manner as described herein. In particular, the cut out sections are provided at a central location along each lengthwise side of each server 10 and between each processor module. As depicted in the figures, each processor module is disposed along one half of the length of the blade server 10, and the cut out sections along each side of the blade server facilitate connections with link modules 100 at the central location and between both processor modules (and between the processors 20 of the processor modules). When the two servers 10 are stacked in the "belly-to-belly" configuration, their corresponding cut-out sections align on each side to facilitate insertion of portions of a link module 100 into the cut out sections and connection of the link module components as described herein.

Figure 4:
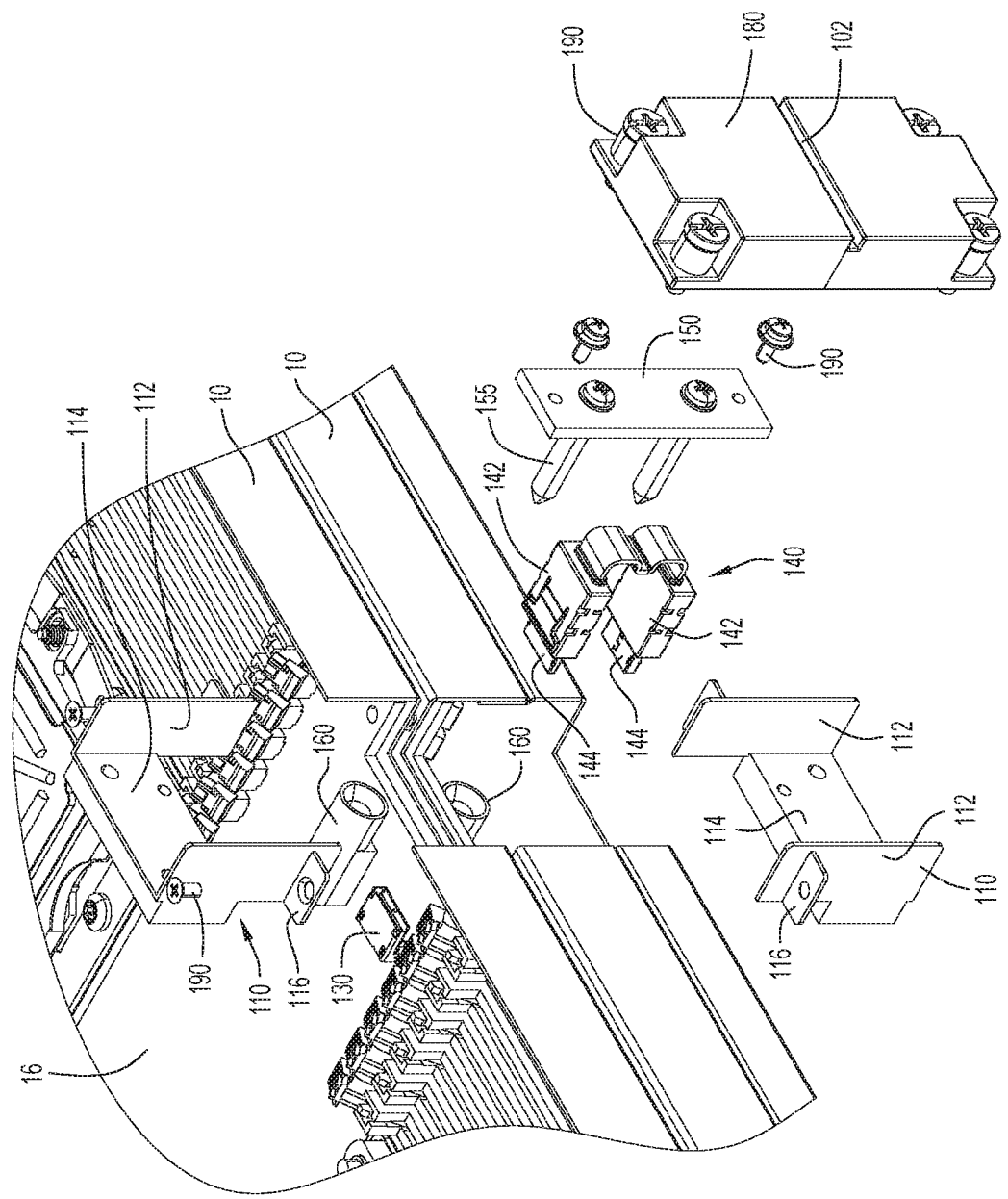
FIG. 4 depicts an enlarged and partial view in perspective of the view in FIG. 3, including separated components of a link module along one side of the system.

As best viewed in FIG. 4, each link module 100 includes a bracket member comprising pair of support brackets 110, a cable connector 140 that connects with a corresponding signal path connector 130 on the PCBA 16 of each server 10, a guide connector that secures to the bracket member and comprises a guide pin connector plate 150 including a pair of guide pins 155 extending from a surface of the connector plate 150, a pair of guide pin receptacles 160, a housing or cage 180, and a plurality of fasteners 190 (e.g., bolts or screws) that secure components of the link module to each server. The bracket member secures to corresponding housing sides of the servers, and the guide connector facilitates alignment of the servers in a configuration in which a PCBA support housing wall of the first server faces a PCBA support housing wall of the second server (i.e., the guide connector assists in alignment of the servers in the "belly-to-belly" configuration during the assembly or installation of the link module). Each of the link module components can be constructed of any suitable material (e.g., steel and/or one or more other metals or metal alloys, one or more polymers or plastic materials, as well as any combinations of such materials) capable of providing suitable structural support as well as suitable signal pathway connections between processors of the blade servers.

The cable connector 140 of each link module 100 includes two connector heads 142, each of which includes a male connector end with suitable electrical contact pins configured to connect with a corresponding female connecting portion of a signal path connector 130 disposed on the PCBA 16 of each server 10. A signal path connector 130 is disposed on the PCBA 16 and along each lengthwise side of each server 10 at a location proximate a cut-out section (i.e., each server PCBA includes two connectors 130, each disposed at a lengthwise side of the server between the two processor modules and at the cut-out sections). Each connector 130 includes signal transmission lines that are integrated within the PCBA 16 and extend to each processor 20 of a processor module in the server 10. As described further herein (signal transmission lines 20A-20D in FIG. 10), each signal transmission line extending from each processor 20 to each connector 130 has the same or substantially similar length dimension such that the signal path trace lengths associated with each server processor is the same or substantially similar.

Each cable connector 140 has a sufficient cable length to extend between the two servers 10 aligned together in the "belly-to-belly" configuration such that the connector heads 142 can align and connect with the signal path connectors 130 of each server. Any suitable contact pin connecting configuration for the male and female connectors of the connector heads 142 and the connector 130 can be provided to facilitate a suitable connection and transfer of signals in a suitable format between processors of the two servers 10 to be connected in a "belly-to-belly" orientation. In the example embodiments, the scalable server system 2 is configured using a UPI configuration for enabling scaling and interaction of the processors for the two linked servers during system operations, and the configuration of contact pins/electrical contacts of the male connector heads 142 of the cable connector 140 and the female signal path connector 130 facilitate a suitable UPI link is created between the two servers when the cable connector 140 is connected with each connector 130.

Each support bracket 110 secures to a PCBA 16 of one of the servers 10 at the cut-out section. In particular, each support bracket 110 has a generally U-shaped configuration including two side portions or side plates 112 and a cross portion or cross plate 114 extending between and at corresponding ends of the two side plates 112. The cross plate 114 only extends a portion of the lengthwise dimension of the side plates 112, thus leaving an opening or gap between the PCBA 16 and a facing edge of the cross plate 114 when the support bracket 110 is secured to the PCBA 16 as described herein. A flange 116 extends outward from and at an opposing end of each side plate 112 (i.e., each flange 116 is located at an end of a side plate 112 that opposes the end from which the cross plate 114 connects with the side plate). Each flange 116 includes a cut out or opening extending through the flange that is sized to receive a fastener 190 which secures the support bracket 110 (via the flange 116) to the PCBA 16 and/or a bottom or supporting wall of the server housing 12. The cross plate 114 also includes a plurality of cut outs or openings extending through the plate 114 to receive fasteners 190 for securing the guide connector plate 150 and the cage 180 to each support bracket 110 as described herein. Each support bracket 110 is further dimensioned to fit within the cut-out section along a side of a server 10 such that the flanges 116 secure at or proximate opposing edges of the cut-out section.

A guide pin receptacle 160 is mounted on the PCBA 16 along each side of each server 10 at or proximate the cut-out section. Each guide pin receptacle 160 has a generally cylindrical configuration that is suitably dimensioned to receive a corresponding cylindrically shaped guide pin 155 of a connector plate 150. While the guide pins and guide pin receptacles are cylindrical in shape, other shapes are also possible (e.g., triangular, square, multi-faceted, etc.). Each connector plate 150 is further suitably dimensioned with an adequate distance between the two guide pins 155 along the plate 150 such that the plate fits lengthwise into the cut-out sections of the two aligned servers 10 so that the guide pins 155 are received within corresponding receptacles 160 of the servers. Each guide pin connector plate 150 also includes openings extending though the plate that align with corresponding openings in the cross plates 114 of the brackets 110 to facilitate connection of the connector plate 150 to the cross plate 114 of each bracket 110 via fasteners 190.

Figure 2:
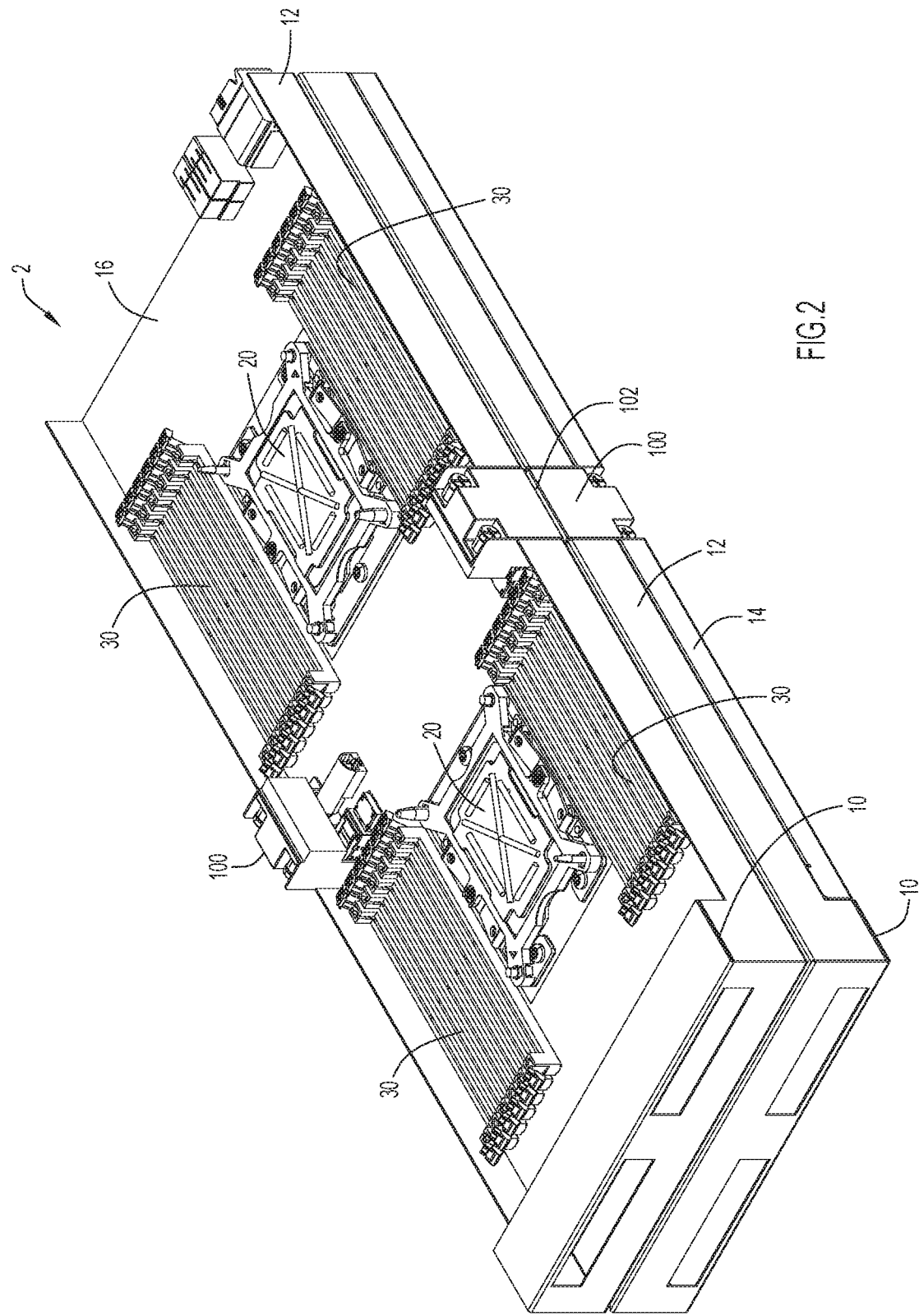
FIG. 2 depicts a view in perspective of the scalable multiprocessor system of FIG. 1, where a housing cover is removed from one of the servers.
Figure 3:
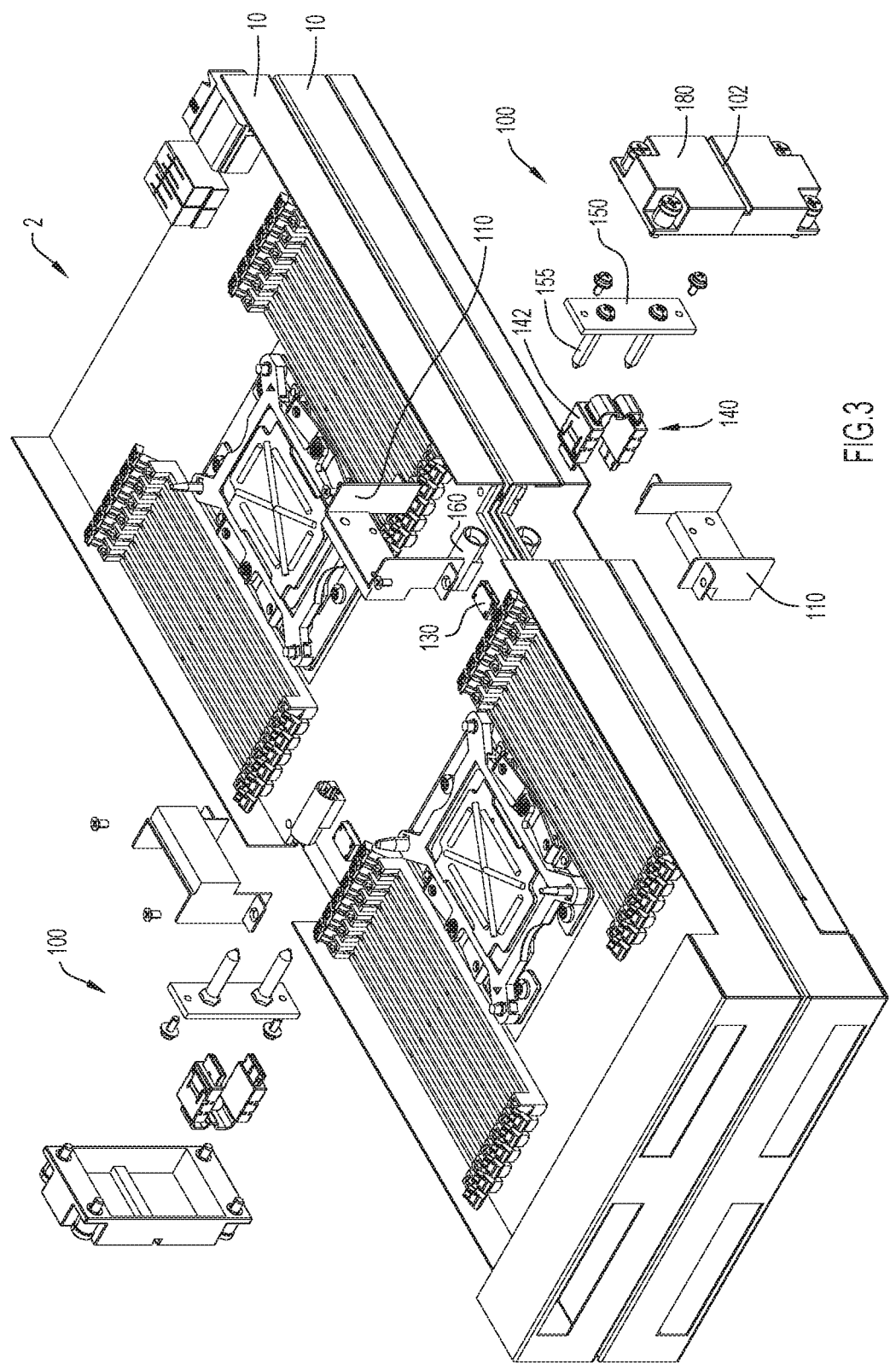
FIG. 3 depicts a view in perspective and partial exploded view of the scalable multiprocessor system as shown in FIG. 2, where components of the link module on either side of the system are separated from each other.
Figure 9:
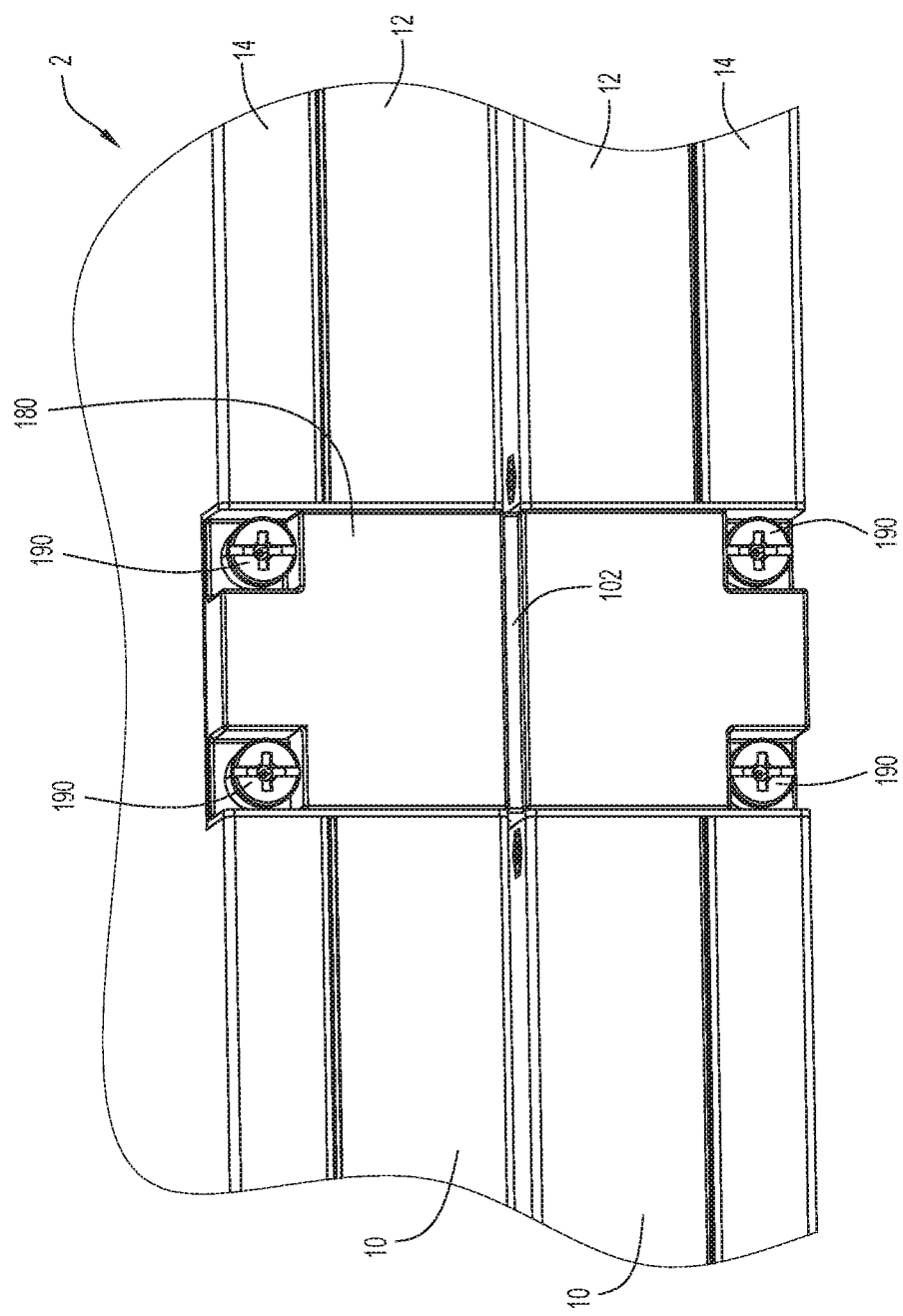

Each cage 180 is suitably dimensioned and shaped to fit within the cut-out section, between the side plates 112 of the installed brackets 110 and around the installed connector plate 150 and cable connector 140 at each side of the combined servers. As depicted in FIG. 1, when the cage 180 of each link module 100 is installed in the system 2, an exterior wall of the cage is flush or generally coplanar with the corresponding sidewall surfaces of the housing 12 for each server 10. The cage 180 of each link module 100 provides a closure to the housing interiors of the combined servers 10 while also covering and protecting link module components (and, in particular, the signal path link connection between the processors of the servers) and adding further structural integrity and strength to the link module connection between the servers 10. The cage 180 also encloses the server housing interiors at the cut-out sections so as to minimize or prevent airflow leakage from each server 10. In addition, the exterior wall of the cage 180 includes a slot or groove 102 extending across its width so as to align with the interface between PCBA supporting walls of the housings 12 of both servers 10. For example (and as depicted in FIGS. 1, 2 and 9), a slight spacing can exist between the servers at the "belly-to-belly" connection, and the groove 102 along the exterior wall of the cage 180 is aligned with spacing between the servers 10 along the side of the system 2. The cage groove 102 is provided to correspond with the spacing between the combined servers so as to not interfere with a divider in a server chassis when the server system 2 is loaded within the chassis. In addition, the cage groove 102 can also be configured to provide an easy separation of the cage 180 into halves (e.g., for situations in which a server is not combined within another server as described herein with reference to FIGS. 11 and 12).

Installation of a link module 100 to one side of the scalable multiprocessor server system 2 is now described with reference to FIGS. 1-9. The installation of a link module 100 is described for a single side of the system 2 (i.e., along the corresponding lengthwise sides of the aligned servers 10). It is noted that a link module 100 is also installed on the other side of the system 2 in the same or similar manner, where the installation steps can be performed in consecutive manner for both sides or, alternatively, installation steps for the link module 100 can be performed first on one side of the system 2 followed by the same or similar installation steps being performed for another link module 100 on the other side of the system. In addition, while the installation steps are described in a particular consecutive order (as shown consecutively in FIGS. 5-9), the installation method is by way of example only (e.g., at least some of the installation steps can also be performed in a different order to achieve the same final installation).

Figure 5:
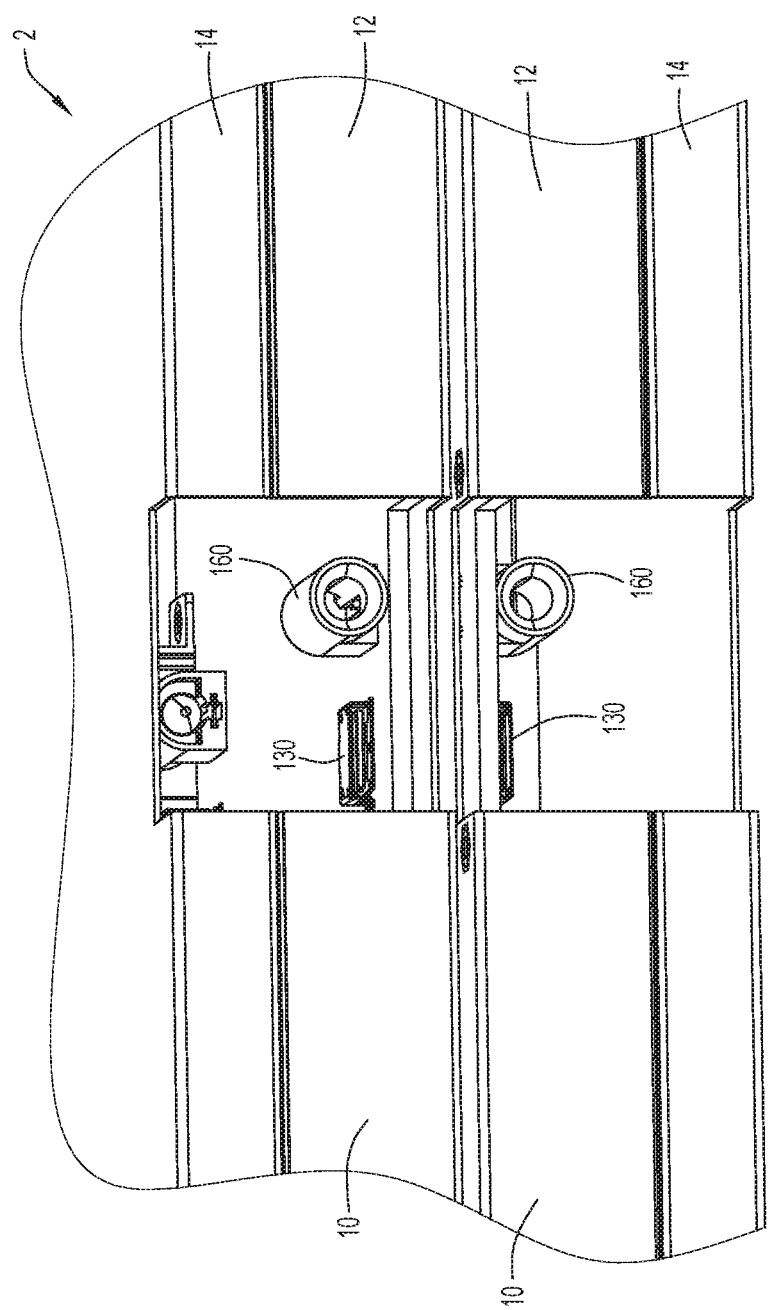
FIGS. 5-9 depict enlarged and partial side views of the system of FIG. 1, which shows an example embodiment of consecutive steps for installing components of the link module along the side of the system.

Referring to FIG. 5, two half width blade servers 10 are provided that are substantially similar in design and configuration, with cut-out sections and signal path connectors 130 being affixed to the PCBA 16 and located at or proximate the cut-out sections along each lengthwise side of each server 10. A guide pin receptacle 160 is connected to the PCBA 16 (and/or the housing wall that supports the PCBA) at or proximate each cut-out section along each side of each server 10. The half width blade servers 10 are aligned in a "belly-to-belly" orientation, such that the bottom or PCBA support wall of the housing 12 for each server 10 is facing and engages the corresponding housing support wall of the other server.

Figure 6:
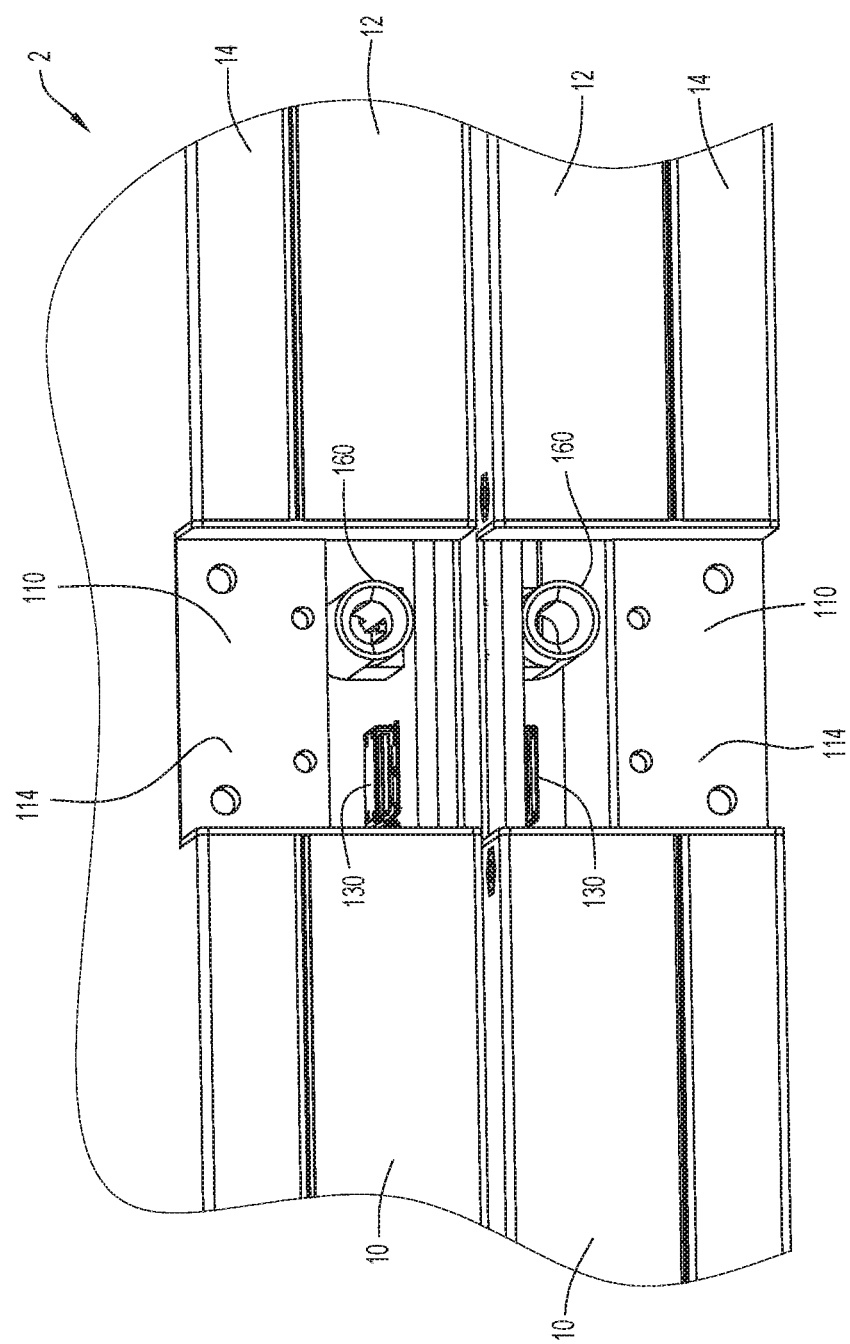

Referring to FIG. 6, a pair of support brackets 110 of the module 100 are inserted into the cut-out section and are connected at a side of the system 2. In particular, each bracket 110 is aligned within the cut-out section of a server 10 such that its cross plate 114 is located adjacent the top cover 14 of the server housing 12. In other words, the brackets 110 are secured to each server 10 such that there is a 180° rotational orientation of one bracket in relation to the other in their installed positions for the link module 100. Each bracket 110 is secured to the PCBA 16 and/or PCBA housing support wall via fasteners 190 and their support flanges 116. As depicted in FIG. 6, the cross plate 114 for each installed bracket 110 has suitable dimensions in relation to the lengthwise dimensions of the bracket side plates 112 such that a suitable gap or spacing exists between the PCBA 16 and the cross plate edge that faces the PCBA, and this gap or spacing provides sufficient exposure and access to the signal path connector 130 and guide pin receptacle 160 for each server 10 by other components of the link module 100.

Figure 7:
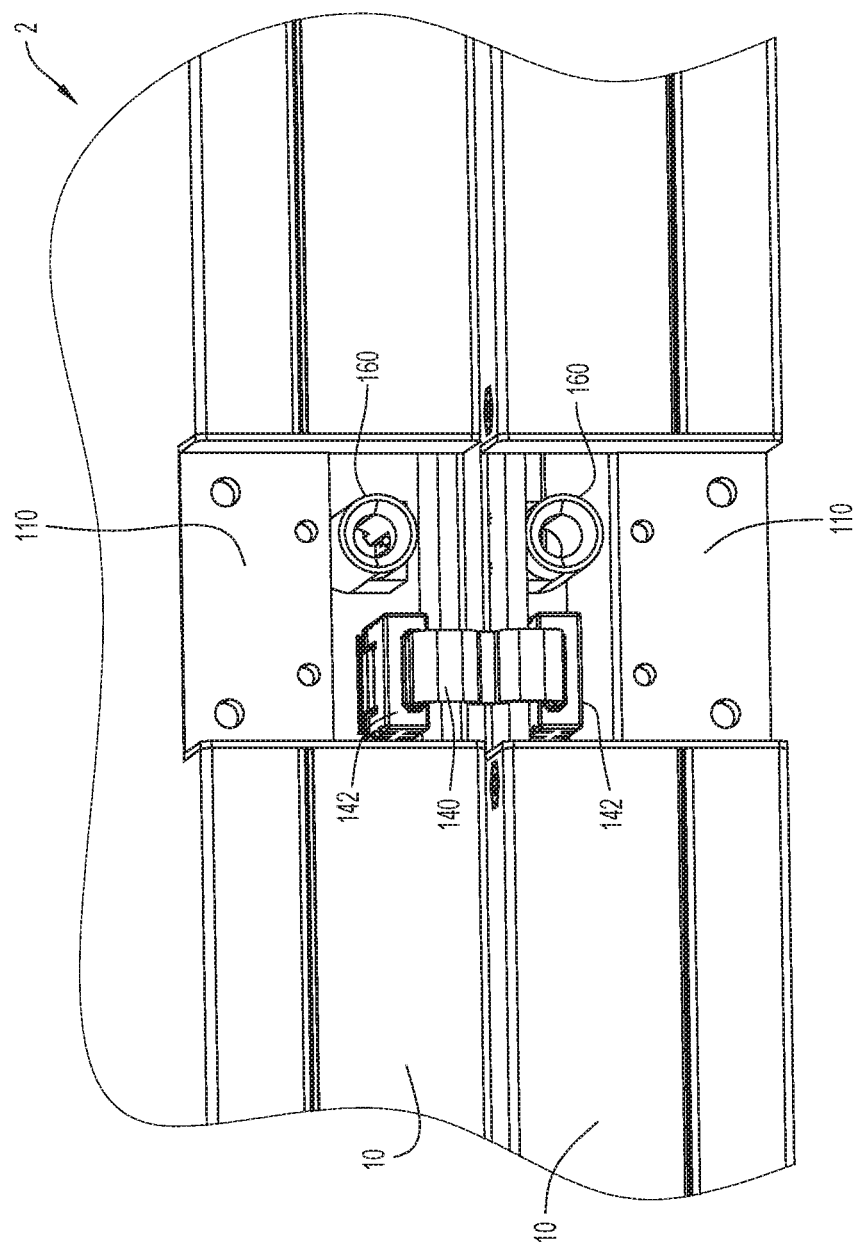
Figure 8:
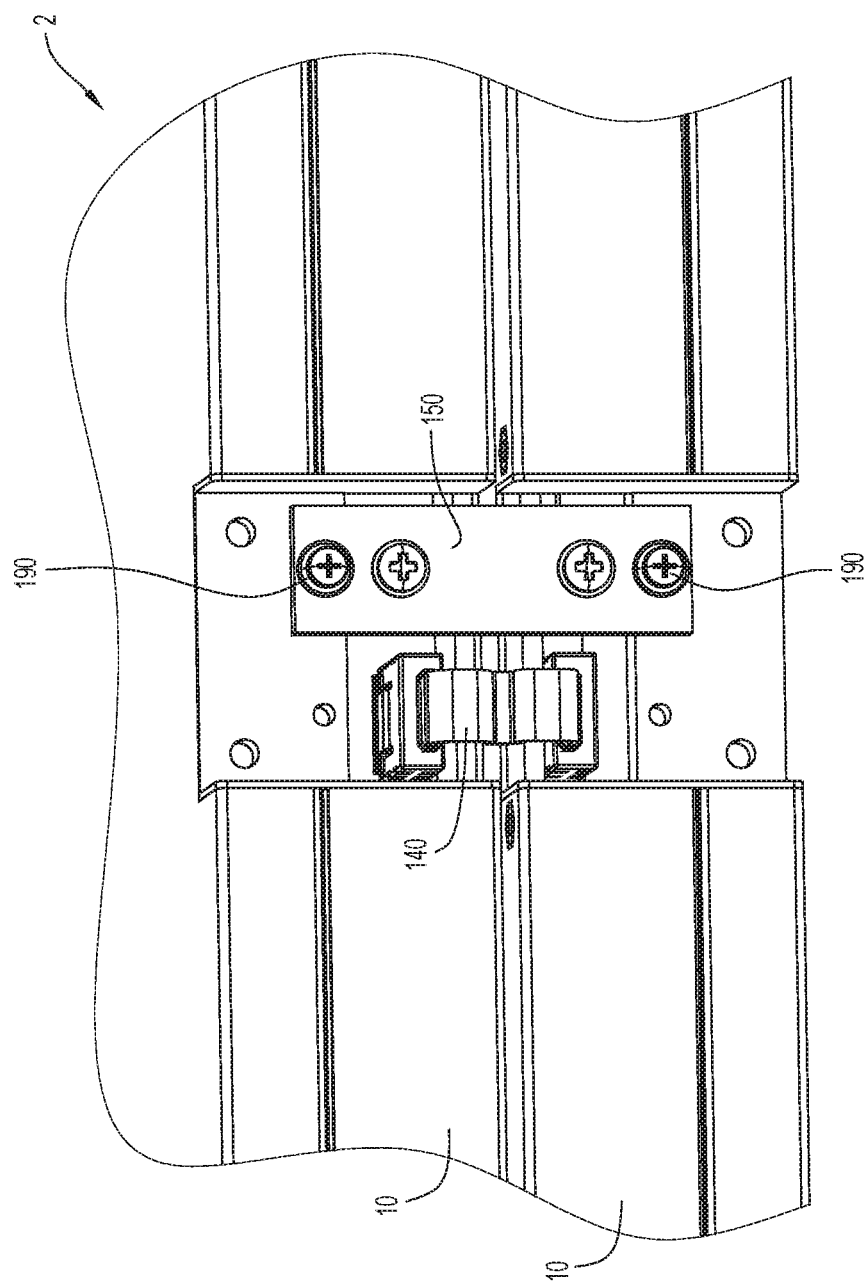

Referring to FIG. 7, the cable connector 140 of the link module 100 is installed by inserting the male connector heads 142 of the connector 140 into the female connecting portions of the signal path connectors disposed on the PCBAs 16 of the servers 10. At FIG. 8, the connector plate 150 is aligned in the cut-out sections of the servers 10 along the one side such that the guide pins 155 are received into the receptacles 160. Upon full insertion of the guide pins 155 into the guide pin receptacles 160, the end portions of the connector plate 150 engage with the cross plates 114 of the brackets 110. A fastener 190 is inserted through and connected within the corresponding openings located at the connector plate ends and the cross plates 114 of the brackets 110. Complete installation of the guide pin connector plate 150 (with guide pins 155 secured within receptacles 160 and the plate 150 secured to each server 10 via a corresponding bracket 110) firmly and mechanically secures the servers 10 together in the "belly-to-belly" configuration so as to define a single, integrally connected system 2 of components. At FIG. 9, the cage 180 is fit within the cut-out sections of the servers 10 and also between the side plates 112 of each bracket 110 such that the exterior end wall of the cage is substantially flush or coplanar with the corresponding sidewalls of the housings 12 and housing covers 14 of the servers 10. A plurality of fasteners 190 (e.g., located at or proximate each corner of the cage exterior end wall) extend through and are secured within corresponding openings of the cage 180 and cross plates 114 of the brackets 110. This fastener connection firmly and mechanically secures the cage 180 along the side of the server system 2 and also adds further support and stability to the "belly-to-belly" connection configuration of the servers 10.

Figure 10:
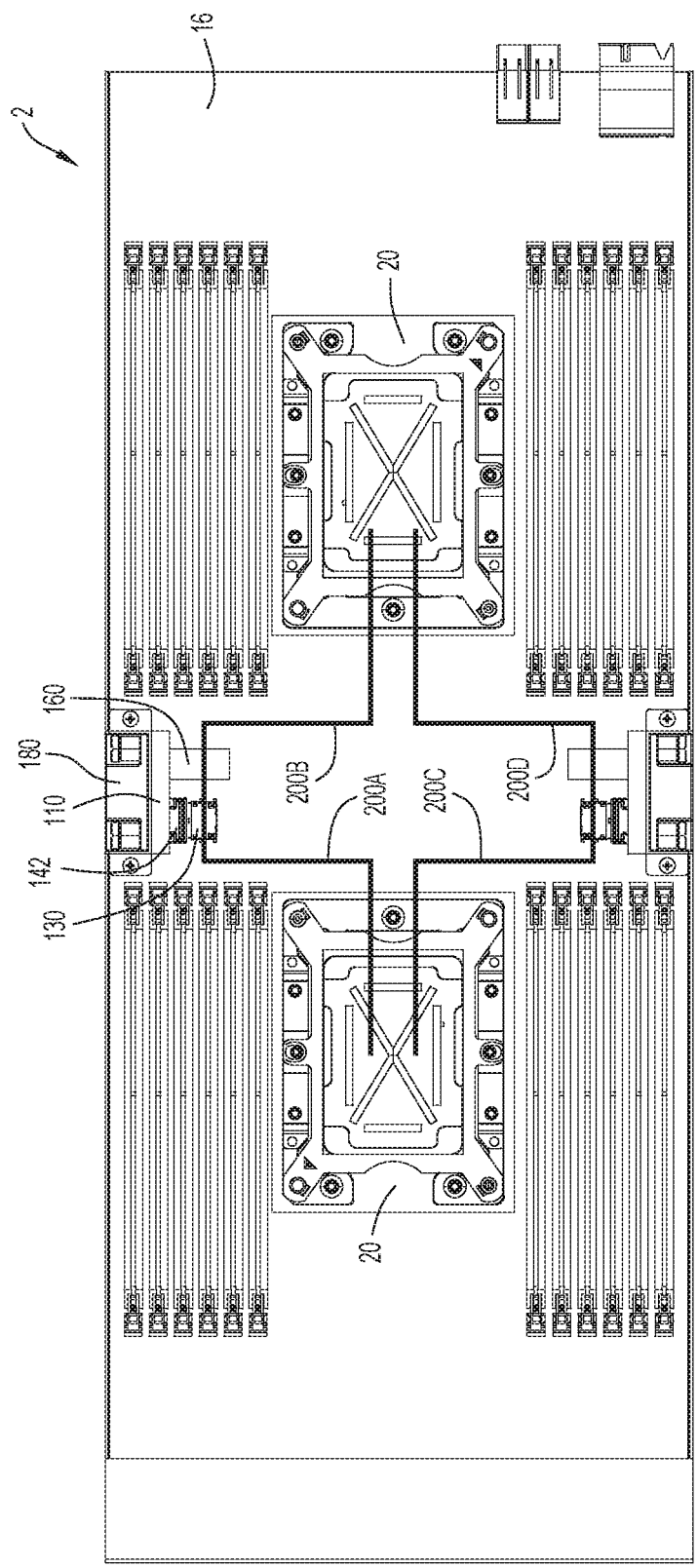
FIG. 10 is a top view in plan of the system of FIG. 1, with the top cover of a server removed to show signal path transmission lines extending from processors of the server to signal path connectors associated with the link modules of the system.

A top view of the system 2 (with the housing cover 14 of a server 10 removed) is depicted in FIG. 10 for ease of illustration of the signal path transmission lines 200A, 200B, 200C and 200D from processors 20 to the signal path connectors 130. The signal path transmission lines 200 (e.g., UPI link traces) can be electrical signal interconnects or any other suitable structure that is integrated within the PCBA 18 and facilitates the transmission of signals along such transmission line, where each signal transmission line 200 extends from a processor 20 to a signal path connector 130 at one side of the server 10. In the example embodiment, each server includes two signal transmission lines 200, each of which extends to one of the connectors 130 (e.g., line 200A extends from a first processor 20 to a first connector 130, line 200B extends from the other or second processor 20 to the first connector 130, line 200C extends from the first processor 20 to a second connector 130, and line 200D extends from the second processor 20 to the second connector 130). Each server 10 includes this signal path transmission line configuration, and this configuration allows the processors of both servers to interact with each other for certain processing operations. The locations of the processors 20 on the PCBA 18 for each server 10, combined with the locations of the signal path connectors 130 along each side of each processor 20 (near the cut-out section and between the processor modules of each server) facilitates providing signal path transmission lines (e.g., UPI link traces) that are of the same or substantially similar lengths (e.g., each line 200A, 200B, 200C and 200D has the same or substantially similar length). Further, the universal design of the link module (which, as depicted in the figures, can be installed on either side of the system 2), with the cable connector 140 for each server side having the same configuration (and thus the same or substantially similar cable length), provides a signal path or trace length that is the same or substantially similar between each processor on one server and each processor on the other server.

Figure 11:
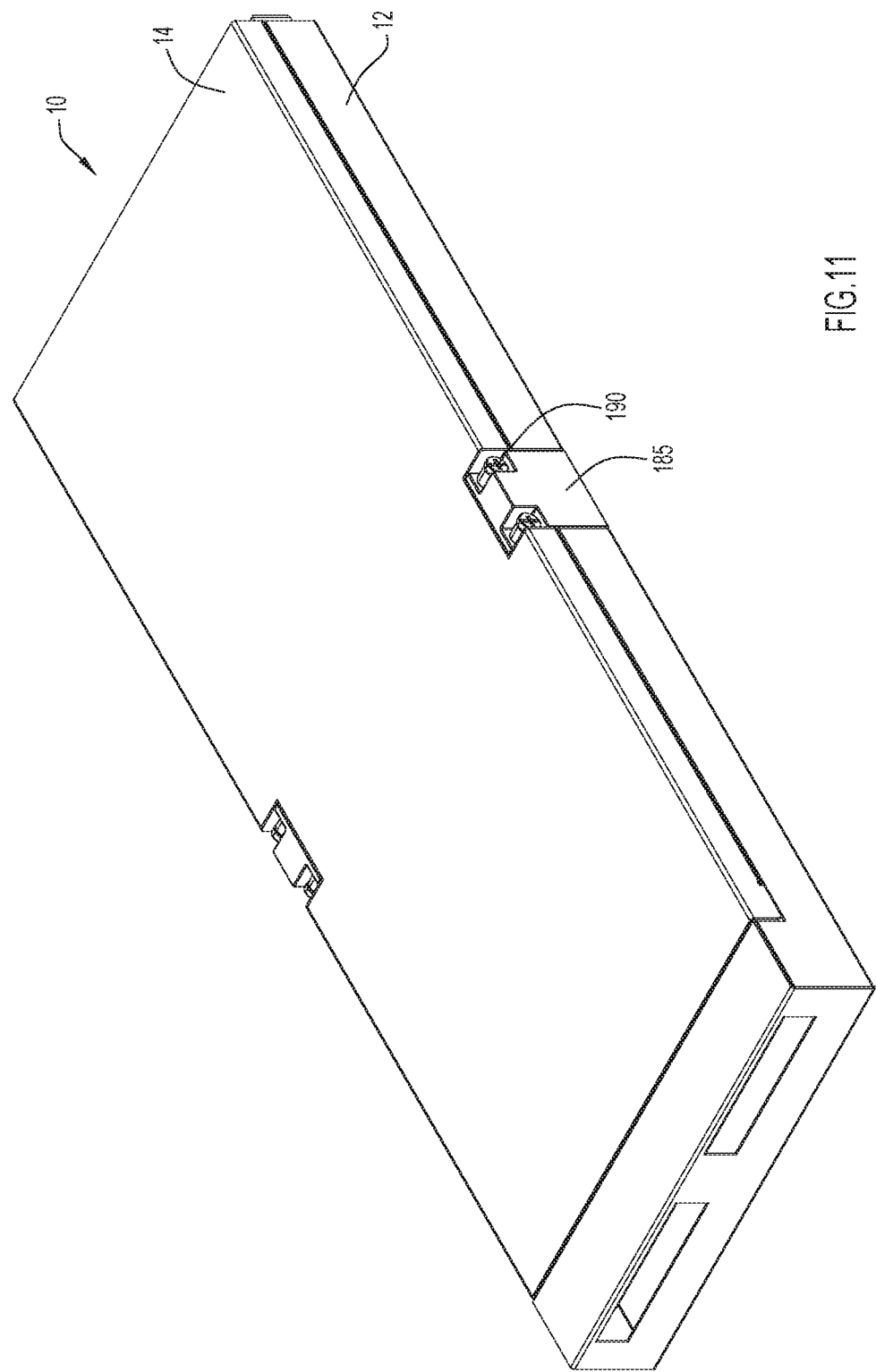
FIG. 11 depicts a view in perspective of another embodiment of a link module connected to a single server.
Figure 12:
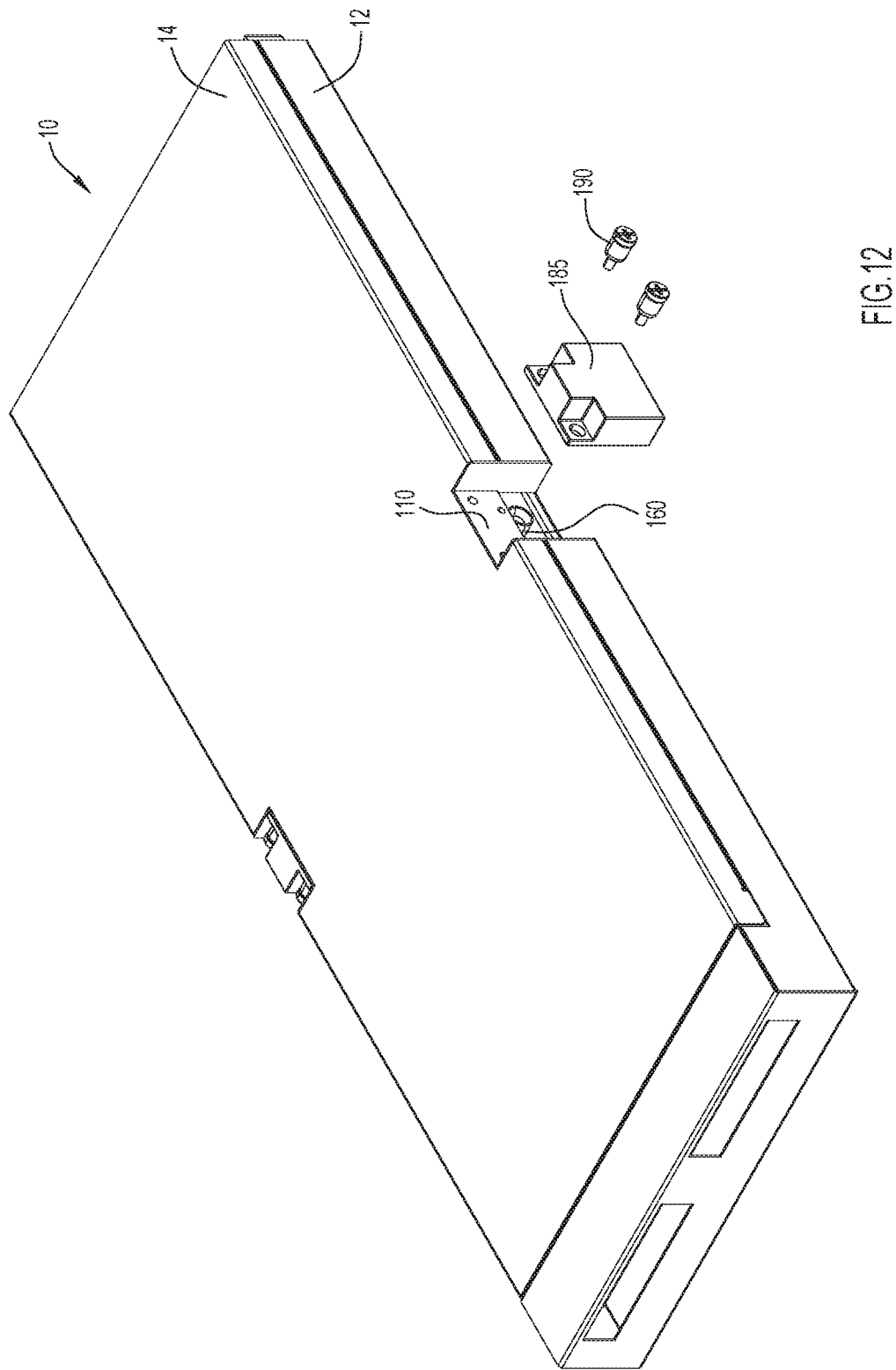
FIG. 12 depicts a view in perspective of single server of FIG. 11, in which the cage of the link module is removed from the server.

In other embodiments in which there is no desire or need to combine servers for scaling processors, the link module design can be slightly modified as depicted in the embodiments of FIGS. 11 and 12. In particular, the link module 100 can be modified simply by altering the cage 180, e.g., by separating the cage 180 at its groove 102 so as to form a partial cage 185. The partial or revised cage 185 is assembled in the same manner by connecting the cage 185 via fasteners 190 (e.g., at its corner edges) to the cross plate 114 of the support bracket 110. In this example embodiment, there is no need to install with the server the cable connector 140 or the connector plate 150 of the link module 100. The cage 185 serves to enclose the housing 12 (at the cut-out section) of the server 10 so as to protect components therein (i.e., in a similar manner as for cage 180) and also to minimize or prevent airflow leakage from the server 10.

The link module 100 described herein provides an easy and secure linking structure to connect two servers (or other computing devices) together to achieve a scalable multiprocessor system.

A guide connector of the link module (e.g., a guide connector plate 150 with guide pins 155 configured to be inserted within the guide pin receptacles 160 of the servers 10) facilitates guiding the servers together for connection in the proper "belly-to-belly" orientation with each other as well as providing a firm and rigid structural supporting connection (e.g., when the plate 150 connects with the support bracket 110).

Utilizing a cable connector (e.g., connector 140) provides a suitable connection between the two servers that is flexible and avoids an potential damage to the signal pathway connection between server processors since the cable connector does not bear any of the weight of either server (due to the other component connections of the link module). Further, the flexibility of the cable allows for some slight force or pressure to be applied to the cable without causing damage (unlike other conventional transmission signal link connections provided, e.g., using a rigid PCB card or other structure). The configuration of processors, signal transmission lines from the processors to signal path connectors, and cable connectors further ensures that the signal path lengths or trace lengths of the signal pathways between processors on each server as well as between processors of two servers are the same or substantially similar. Thus, the link module of the example embodiments described herein enables the connection between two computing devices, such as two servers (e.g., two half width blade servers), to obtain a scalable multiprocessor system that increases the overall computing performance of the system.

Thus, example embodiments of a scalable multiprocessor computing system comprise a first computing device including a housing, a printed circuit board assembly (PCBA) secured within the housing, and a processor and memory integrated with the PCBA, a second computing device including a housing, a printed circuit board assembly (PCBA) secured within the housing, and a processor and memory integrated with the PCBA, and a link module connecting the first computing device with the second computing device. The link module comprises a guide connector that aligns and couples the first computing device with the second computing device in an orientation in which a PCBA support housing wall of the first computing device faces a PCBA support housing wall of the second computing device, a bracket member that is connected along corresponding lengthwise sides of the first and second computing devices, and a cable connector that provides a signal connection between the processor of the first computing device and the processor of the second computing device. The guide connector is connected to the bracket member.

Each of the first and second computing devices can include two processors, the system further comprising a first link module connected along first corresponding lengthwise sides of the first and second computing devices and a second link module connected along second corresponding lengthwise sides of the first and second computing devices, and each of the first and second link modules is located between the two processors of each computing device.

The link module further can further comprise a cage connected along the corresponding lengthwise sides of the first and second computing devices, wherein the cage covers the guide connector, the bracket member and the cable connector.

The bracket member can comprise a first bracket that is connected with a portion of the housing of the first computing device and a second bracket that is connected with a portion of the housing of the second computing device such that the first and second brackets are aligned along the corresponding lengthwise sides of the first and second computing devices.

The guide connector can comprise a guide plate and a plurality of guide pins extending from the guide plate, where the system further comprises a first guide pin receptacle disposed on the PCBA of the first computing device, and a second guide pin receptacle disposed on the PCBA of the second computing device. Each of the first and second guide pin receptacles is oriented to receive and retain a corresponding guide pin of the guide plate when the guide plate is connected with the bracket member.

The guide plate can connect with each of the first and second brackets.

The housings of the first and second computing devices can include cut-out sections along the corresponding lengthwise sides, where the first bracket is secured within the cut-out section of the housing of the first computing device, and the second bracket is secured within the cut-out section of the housing of the second computing device.

Each of the first and second brackets can have a U-shape and includes two side plates spaced from each other and a cross plate located at an end of each bracket and connecting the side plates, and each bracket can connect to the PCBA and/or a PCBA support wall of the computing device housing at a portion of the side plates that is spaced from the cross plate. Each of the cage and the guide plate can connect with the cross plates of the first and second brackets.

Each of the first and second computing devices can include a plurality of signal transmission lines extending from the processor to a signal path connector disposed on the PCBA, and the cable connector can connect with the signal path connectors of the first and second computing devices. Further, each signal transmission line can have the same signal path length.

Each of the first and second computing devices can comprise a blade server (e.g., a half width blade server).

In other example embodiments, a link module can be provided for connecting a first computing device with a second computing device to form a scalable multiprocessor system, each of the computing devices including a housing and a printed circuit board assembly (PCBA) secured within the housing and including a processor, where the link module comprises the following: a guide connector that aligns the first computing device with the second computing device in a configuration in which a PCBA support housing wall of the first computing device faces a PCBA support housing wall of the second computing device, a bracket member that is connectable along corresponding lengthwise sides of the first and second computing devices, and a cable connector that provides a signal connection between the processor of the first computing device and the processor of the second computing device. The guide connector connects with the bracket member.

A cage can be provided that is connectable along the corresponding lengthwise sides of the first and second computing devices so as to cover the guide connector, the bracket member and the cable connector when the link module is connected with the computing devices.

The bracket member can comprise a first bracket that connects with a portion of the housing of the first computing device and a second bracket that connects with a portion of the housing of the second computing device such that the first and second brackets are aligned along the corresponding lengthwise sides of the first and second computing devices when the link module is connected with the computing devices.

The guide connector can comprise a guide plate and a plurality of guide pins extending from the guide plate, wherein each guide pin is receivable and retainable within a corresponding guide pin receptacle disposed on the PCBA of one of the first and second computing devices. Each of the first and second brackets can have a U-shape and include two side plates spaced from each other and a cross plate located at an end of each bracket and connecting the side plates, and each bracket is connectable with the PCBA and/or a PCBA support wall of the computing device housing for one of the first and second computing devices at a portion of the side plates that is spaced from the cross plate. Further, each of the cage and the guide plate is connectable to the cross plates of the first and second brackets.

In further example embodiments, a method of forming a scalable multiprocessor computing system, the method comprises providing a first computing device including a housing, a printed circuit board assembly (PCBA) secured within the housing, and a processor and memory integrated with the PCBA, providing a second computing device including a housing, a printed circuit board assembly (PCBA) secured within the housing, and a processor and memory integrated with the PCBA, orienting the first computing device with the second computing device in a belly-to-belly configuration such that a PCBA support housing wall of the first computing device faces a PCBA support housing wall of the second computing device, and providing a link module that connects along corresponding lengthwise sides of the first and second computing devices by connecting a bracket member along the corresponding lengthwise sides of the first and second computing devices, coupling a guide connector to the first computing device and the second computing device oriented in the belly-to-belly configuration, and connecting a cable connector with signal path connectors disposed on the PCBAs of the first and second computing devices to provide signal connections between the processors of the first and second computing devices.

Each of the first and second computing devices can include a plurality of signal transmission lines extending from the processor to the signal path connector disposed on the PCBA, and each signal transmission line has the same signal path length. In addition, each of the first and second computing devices can include two processors, and the method can further comprise providing a first link module that connects along first corresponding lengthwise sides of the first and second computing devices and a second link module that connects along second corresponding lengthwise sides of the first and second computing devices, and each of the first and second link modules connects so as to be located between the two processors of each computing device.

The above description is intended by way of example only.

What is claimed is:

1. A scalable multiprocessor computing system comprising:
   a first computing device including a housing, a printed circuit board assembly (PCBA) secured within the housing, and a processor and memory integrated with the PCBA;
   a second computing device including a housing, a printed circuit board assembly (PCBA) secured within the housing, and a processor and memory integrated with the PCBA; and
   a link module connecting the first computing device with the second computing device, the link module comprising:
      a guide connector that aligns and couples the first computing device with the second computing device in an orientation in which a PCBA support housing wall of the first computing device faces a PCBA support housing wall of the second computing device;
      a bracket member that is connected along corresponding lengthwise sides of the first and second computing devices; and
      a cable connector that provides a signal connection between the processor of the first computing device and the processor of the second computing device;
      wherein the guide connector is connected to the bracket member.

2. The system of claim 1, wherein each of the first and second computing devices includes two processors, the system further comprises a first link module connected along first corresponding lengthwise sides of the first and second computing devices and a second link module connected along second corresponding lengthwise sides of the first and second computing devices, and each of the first and second link modules is located between the two processors of each computing device.

3. The system of claim 1, wherein the link module further comprises a cage connected along the corresponding lengthwise sides of the first and second computing devices, wherein the cage covers the guide connector, the bracket member and the cable connector.

4. The system of claim 1, wherein each of the first and second computing devices comprises a blade server.

5. The system of claim 1, wherein each of the first and second computing devices includes a plurality of signal transmission lines extending from the processor to a signal path connector disposed on the PCBA, and the cable connector connects with the signal path connectors of the first and second computing devices.

6. The system of claim 5, wherein each signal transmission line has a same signal path length.

7. The system of claim 3, wherein the bracket member comprises a first bracket that is connected with a portion of the housing of the first computing device and a second bracket that is connected with a portion of the housing of the second computing device such that the first and second brackets are aligned along the corresponding lengthwise sides of the first and second computing devices.

8. The system of claim 7, wherein the guide connector comprises a guide plate and a plurality of guide pins extending from the guide plate, and the system further comprises:
   a first guide pin receptacle disposed on the PCBA of the first computing device; and
   a second guide pin receptacle disposed on the PCBA of the second computing device;
   wherein each of the first and second guide pin receptacles is oriented to receive and retain a corresponding guide pin of the guide plate when the guide plate is connected with the bracket member.

9. The system of claim 8, wherein the guide plate connects with each of the first and second brackets.

10. The system of claim 7, wherein the housings of the first and second computing devices include cut-out sections along the corresponding lengthwise sides, the first bracket is secured within the cut-out section of the housing of the first computing device, and the second bracket is secured within the cut-out section of the housing of the second computing device.

11. The system of claim 8, wherein each of the first and second brackets has a U-shape and includes two side plates spaced from each other and a cross plate located at an end of each bracket and connecting the side plates, and each bracket connects to the PCBA and/or a PCBA support wall of the housing at a portion of the side plates that is spaced from the cross plate.

12. The system of claim 11, wherein each of the cage and the guide plate connects with the cross plates of the first and second brackets.

13. A link module for connecting a first computing device with a second computing device to form a scalable multiprocessor system, each of the first and second computing devices including a housing and a printed circuit board assembly (PCBA) secured within the housing and including a processor, the link module comprising:
 a guide connector that aligns the first computing device with the second computing device in a configuration in which a PCBA support housing wall of the first computing device faces a PCBA support housing wall of the second computing device;
  a bracket member that is connectable along corresponding lengthwise sides of the first and second computing devices; and
  a cable connector that provides a signal connection between the processor of the first computing device and the processor of the second computing device;
  wherein the guide connector connects with the bracket member.

14. The link module of claim 13, further comprising a cage connectable along the corresponding lengthwise sides of the first and second computing devices so as to cover the guide connector, the bracket member and the cable connector when the link module is connected with the computing devices.

15. The link module of claim 14, wherein the bracket member comprises a first bracket that connects with a portion of the housing of the first computing device and a second bracket that connects with a portion of the housing of the second computing device such that the first and second brackets are aligned along the corresponding lengthwise sides of the first and second computing devices when the link module is connected with the computing devices.

16. The link module of claim 15, wherein the guide connector comprises a guide plate and a plurality of guide pins extending from the guide plate, wherein each guide pin is receivable and retainable within a corresponding guide pin receptacle disposed on the PCBA of one of the first and second computing devices.

17. The link module of claim 16, wherein:
 each of the first and second brackets has a U-shape and includes two side plates spaced from each other and a cross plate located at an end of each bracket and connecting the side plates, and each bracket is connectable with the PCBA and/or a PCBA support wall of the housing for one of the first and second computing devices at a portion of the side plates that is spaced from the cross plate; and
 each of the cage and the guide plate is connectable to the cross plates of the first and second brackets.

18. A method of forming a scalable multiprocessor computing system, the method comprising:
 providing a first computing device including a housing, a printed circuit board assembly (PCBA) secured within the housing, and a processor and memory integrated with the PCBA;
 providing a second computing device including a housing, a printed circuit board assembly (PCBA) secured within the housing, and a processor and memory integrated with the PCBA;
 orienting the first computing device with the second computing device in a belly-to-belly configuration such that a PCBA support housing wall of the first computing device faces a PCBA support housing wall of the second computing device; and
 providing a link module that connects along corresponding lengthwise sides of the first and second computing devices by:
  connecting a bracket member along the corresponding lengthwise sides of the first and second computing devices;
  coupling a guide connector to the first computing device and the second computing device oriented in the belly-to-belly configuration; and
  connecting a cable connector with signal path connectors disposed on the PCBAs of the first and second computing devices to provide signal connections between the processors of the first and second computing devices.

19. The method of claim 18, wherein each of the first and second computing devices includes a plurality of signal transmission lines extending from the processor to the signal path connector disposed on the PCBA, and each signal transmission line has a same signal path length.

20. The method of claim 18, wherein each of the first and second computing devices includes two processors, and the method further comprises providing a first link module that connects along first corresponding lengthwise sides of the first and second computing devices and a second link module that connects along second corresponding lengthwise sides of the first and second computing devices, and each of the first and second link modules connects so as to be located between the two processors of each computing device.

* * * * *